Patented Dec. 25, 1951

2,579,580

UNITED STATES PATENT OFFICE 2,579,580

CYANOETHYLATION

Benjamin W. Howk and Carl M. Langkammerer, Wilmington, Del., assignors to E. I. du Pont de Nemours & Company, Wilmington, Del., a corporation of Delaware No Drawing. Application September 18, 1950, Serial No. 185,506

8 Claims. (Cl. 260—465.1)

This invention relates to a new method of carrying out cyanoethylation reactions. More particularly, it relates to a new cyanoethylation method utilizing certain catalysts which remain solid in the reaction mixture, thus carrying out the cyanoethylation reaction in a heterogeneous system.

It is known that many organic and inorganic compounds possessing labile or active hydrogen atoms add to acrylonitrile to form compounds containing a beta-cyanoethyl group,

—CH$_2$—CH$_2$—CN

This reaction is known as cyanoethylation. An excellent and complete discussion of it is found in "Organic Reactions," vol. V, (John Wiley and Sons, 1949), in chapter 2, by H. A. Bruson, entitled "Cyanoethylation."

The cyanoethylation reaction usually requires the use of a strongly alkaline catalyst. It has been customary heretofore to use for this purpose homogeneous systems containing such catalytic materials as are soluble in the reaction mixture, for example, the oxides, hydroxides, alkoxides, hydrides, and cyanides of the alkali metals, or the alkali metals themselves, or soluble quaternary ammonium bases. The use of these catalysts in homogeneous systems is attended by certain disadvantages, some of which are pointed out in the Bruson article referred to above. For example, many reactions thus catalyzed are strongly exothermic and require carefully controlled addition of the acrylonitrile, with adequate provisions for temperature control; the presence of a dissolved strong base may be injurious to many reactants; the separation of the reaction products from the dissolved catalyst may be difficult; the method is not well adapted to continuous operation. A further and very important disadvantage lies in the fact that, with reactants having two or more active hydrogen atoms, the previously used catalysts have a strong tendency to lead to polycyanoethylation products, i. e., to molecules containing two or more cyanoethyl groups. The monocyanoethylation products, which are often the most useful ones, are generally obtained in very low yields.

It is an object of this invention to provide a new cyanoethylation process.

It is another object of this invention to provide a cyanoethylation process which will overcome the disadvantages of similar, previously-known processes.

It is another object of this invention to provide a cyanoethylation process in which a material proportion of the products are monocyanoethylation products.

Other objects of this invention will appear hereinafter.

The above objects may be accomplished by carrying out the cyanoethylation reaction in the presence of a catalyst comprising a cross-linked polyquaternary ammonium hydroxide resin.

Cross-linked polyquaternary ammonium hydroxide resins are substantially insoluble in aqueous and non-aqueous solvents. The term "cross-linked polymers" is used here in its usual and accepted meaning, see, for example, the discussions in Ellis, "The Chemistry of Synthetic Resins" (Reinhold Publishing Corp., 1935) at pages 59–62, or Gilman, "Organic Chemistry" (John Wiley and Sons, 1943, vol. I) in the chapter on Synthetic Polymers by Marvel and Horning, particularly at pages 703, 719, 720, and 750. The polymeric quaternary ammonium hydroxide compounds contain a plurality of nitrogen atoms, four valences of which are attached to carbon through covalent bonds, the fifth one being satisfied by a hydroxyl group. They can be obtained by treating in known manner the corresponding polymeric quaternary ammonium salt with a strong aqueous base such as dilute sodium or potassium hydroxide or silver hydroxide, as described, for example, in "Industrial and Engineering Chemistry" 41, 1265–1268, (1949). Cross-linked, insoluble polymeric quaternary ammonium salts can be prepared by methods known in the art. For the purpose of fully describing this invention, the following illustrative classes of polymeric quaternary ammonium salts may be mentioned.

A. Polyvinylpyridine or polyvinylquinoline, quaternized by treatment with an alkyl halide or a dialkyl sulfate, as described, for example, in U. S. Patent 2,484,430. These polymers can be insolubilized (cross-linked) in a variety of ways, for example, by copolymerizing the vinyl tertiary amine with a small amount of divinylbenzene prior to quaternization with a monofunctional reactant, or by quaternizing the polytertiary amine with an alkylene dihalide such as ethylene dichloride.

B. The polymerized polyallylalkylammonium salts described by Butler and Bunch in J. Am. Chem. Soc. 71, 3120–3122, (1949). These polymers are inherently cross-linked because of the presence of several unsaturated groups in the monomer. They are readily converted to polyquaternary ammonium hydroxide resins, as described in the reference.

C. The linear polyamides containing intralinear tertiary amino groups, the preparation of which is described in U. S. Patent 2,274,831, quaternized with a bifunctional reactant such as an alkylene dihalide (e. g., trimethylene dibromide or beta,-beta-dichloro diethyl ether) or an arylene dihalide such as p,p'-dibromobenzene, such bifunctional reactant also introducing the necessary cross-linking.

D. The polymeric methacrylic esters containing tertiary amino groups on the ester alcohol residue, as described in U. S. Patent 2,138,762, quaternized with a bifunctional reactant.

E. The polymeric tertiary amines obtained by treating polymeric ketones with monoalkylamines as in U. S. Patent 2,122,707, quaternized with a bifunctional reactant.

F. The amine-phenol-formaldehyde resins, as described in many publications, e. g., U. S. Patent 2,031,557, quaternized with a bifunctional reactant.

Typical compounds containing reactive hydrogen atoms which are known to undergo the cyanoethylation reaction include compounds having one or more —NH— groups, such as ammonia, primary and secondary amines, hydrazine, hydroxyl-amine, lactams, amides; compounds having one or more —OH, —SH, or —AsH— groups such as water, alcohols, phenols, hydrogen sulfide, mercaptans, arsines; certain acidic compounds such as hydrogen cyanide, sodium bisulfite; ketones or aldehydes having a —CH—, —CH$_2$—, or —CH$_3$ group contiguous to the carbonyl groups; compounds having a methylene group activated by various radicals such as —CN (e. g., benzyl cyanide), —NO$_2$ (e. g., nitropropane), —COOH or —COOR (e. g., malonic esters), the ethylenic carbons of a carbocycle or heterocycle (e. g., cyclopentadiene, indene); and the like. Any compound susceptible of undergoing cyanoethylation may be used in the process of this invention.

While the cyanoethylation reaction is generally carried out with acrylonitrile itself as the cyanoethylation agent, it is also applicable to other aliphatic substituted acrylonitriles such as alpha-methylacrylonitrile, crotononitrile, and beta-vinylacrylonitrile.

The invention is illustrated in greater detail in the following examples in which parts are by weight unless otherwise noted.

*Example I*

A mixture of 576 parts (8 moles) of methyl ethyl ketone and 106 parts (2 moles) of acrylonitrile was boiled under reflux and the condensate was allowed to return to the distillation flask through a column containing 30 parts of reaction catalyst supported above the distilling liquid, the column being cooled to 20°-30° C. by means of circulating water. The reaction catalyst was a commercial anion exchange quaternary ammonium salt resin based on cross-linked polyvinylpyridine which had been regenerated, i. e., converted to a polyquaternary ammonium hydroxide, by treatment with 5% aqueous sodium hydroxide and washed with 100 parts of methyl ethyl ketone before use. The distillation was continued for 22 hours, after which the reaction product was acidified with sulfuric acid to prevent possible decomposition and partly evaporated under reduced pressure. A crystalline precipitate of gamma - methyl - gamma - acetopimelonitrile, the dicyanoethylation product, separated and was filtered off. There was obtained 84.4 parts (43.4% yield) of this compounds, M. P. 65°-66° C. Distillation of the filtrate gave 51.5 parts (29% yield) of the monocyanoethylation product, 4-methyl-5-ketocapronitrile, B. P. 54° C. at 0.2 mm. pressure; N%, calculated 11.2; found, 11.2. The total yield was 72.4%. In previous work, using homogeneous catalysts, only the dicyanoethylation product was reported as being obtained in the cyanoethylation of methyl ethyl ketone.

A second charge of the same reactants in the same amounts was distilled for 22 hours over the same resin catalyst used in the first experiment, without any intervening regenerating treatment. There was obtained 24% of the monocyanoethylation product and 44.5% of the dicyanoethylation product, a total yield of 68.5%. In a third similar experiment, again using the same catalyst already used twice, the yield of monocyanoethylation product was 19.9%, and that of dicyanoethylation product 38.8%, a total yield of 58.7%.

*Example II*

Using the procedure of Example I, a mixture of 232 parts (4 moles) of acetone, 106 parts (2 moles) of acrylonitrile, 100 parts of water and 0.4 part of sulfuric acid was refluxed for 19 hours and the distillate was returned to the distillation flask through a column of 60 parts of reaction catalyst maintained at 20°-30° C. by circulating water. The reaction catalyst was another commercial anion exchange resin based on quaternized polyvinyl pyridine previously converted to the corresponding base. Upon cooling the reaction product and filtering the crystalline material which separated, there was obtained 34.8 parts (24% yield) of the tricyanoethylation product, 1,1,1-tricyanoethyl acetone, M. P. 152°-154° C. Fractionation of the filtrate gave 41.6 parts (18.8% yield) of monocyanoethylation product, 5-ketocapronitrile, B. P., 106° C. at 0.5 mm; N%, calculated 12.6; found 12.5. In comparison, it may be noted that the chemical literature (U. S. Patent 2,381,371) reports only 8.5% of 5-ketocapronitrile when acrylonitrile is reacted with acetone in the presence of sodium hydroxide as the catalyst.

*Example III*

A mixture of 69.6 parts (1.2 moles) of acetone, 10.6 parts (0.1 mole) of acrylonitrile and 20 parts of the polyquaternary ammonium hydroxide resin of Example I was stirred at 50° C. for one hour. There was obtained by partial evaporation of the reaction product under reduced pressure 2 parts (13.9% yield) of 1,1,1-tricyanoethyl acetone. Distillation of the filtrate gave 2.52 parts (11.3% yield) of 5-ketocapronitrile.

*Example IV*

Sixty (60) parts of the polyquaternary ammonium hydroxide resin of Example I was washed with 100 parts of methyl propyl ketone. A mixture of 172 parts (2 moles) of methyl propyl ketone and 53 parts (1 mole) of acrylonitrile was passed through the column of resin catalyst over a period of seven hours, the effluent liquid being recirculated by distillation during the period as in Example I. Fractionation of the reaction product gave 28.2 parts (20.3% yield) of the monocyanoethylation product, 4-ethyl-5-ketocapronitrile, B. P. 67° C. at 0.2 mm., $n_D^{25}$ 1.4365, and 41.2 parts (42.9% yield) of the dicyanoethylation product, gamma-ethyl-gamma-acetopimelonitrile, M. P. 107°–109° C., for a total yield of 63.2%. The cyanoethylation of methyl propyl ketone is reported to yield only the dicyanoethylation product using the conventional homogeneous catalysts.

In a second experiment using the same reactants in the same proportions and the same catalyst already used once, the reactants were passed through the catalyst bed over an eight hour period and refluxing was continued for an additional three and one-half hours. There was obtained 39.4 parts (28.3% yield) of 4-ethyl-5-ketocapronitrile and 48 parts (50% yield) of gamma-ethyl-gamma-acetopimelonitrile for a total yield of 78.3%.

The same catalyst was then used a third time in the same manner, the reactants being passed over the catalyst bed over an eight-hour period and refluxing being continued for an additional two hours. The yields of mono- and di-cyanoethylation products were 23.1% and 33.8%, respectively.

*Example V*

Using the procedure and resin catalyst of Example I, a mixture of 288 parts (4 moles) of isobutyraldehyde, 106 parts (2 moles) of acrylonitrile and 100 parts of water was continuously distilled and the condensate was passed through a column containing 57.5 parts of the catalyst at 20°–30° C. for 20 hours. A small amount of polymerized isobutyraldehyde was removed from the reaction product by filtration and the filtrate was distilled, giving 195.2 parts (78% yield) of 4-methyl-4-formyl valeronitrile, B. P. 56° C. at 0.15 mm., $n_D^{25}$ 1.4360.

*Example VI*

A mixture of 106 parts (2 moles) of acrylonitrile, 500 parts (27.7 moles) of water and 0.2 part of sulfuric acid was refluxed for 19 hours and the condensate was returned to the distillation flask through 30 parts of the resin of Example II, maintained at 20°–30° C. Distillation of the reaction product gave 8.3 parts (5.8% yield) of beta-hydroxyproprionitrile, B. P. 62° C. at 0.3 mm., $n_D^{25}$ 1.4330, and 66 parts (53.3% yield) of 2,2′-dicyanodiethyl ether, B. P., 82° C. at 0.3 mm., $n_D^{25}$ 1.4410.

In another experiment, 53 parts of acrylonitrile dissolved in 800 parts of water was given a single pass at 20°–25° C. over 60 parts of a polyquaternary ammonium salt anion exchange resin based on cross-linked polyvinyl pyridine previously converted to the hydroxide form. There was obtained 24.7 parts (34.8% yield) of beta-hydroxypropionitrile and 3.7 parts (6% yield) of 2,2′-dicyanodiethyl ether. Using a homogeneous catalyst such as sodium hydroxide, this reaction has been reported to give only the dicyanoethylation product.

The process of this invention can be carried out in various ways provided there is intimate contact between the liquid reactants and the solid catalyst. As shown in Example III, this can be achieved simply by stirring the mixture of reactants and catalyst. Preferably, the liquid mixture of reactants is passed through a fixed or fluid bed of catalyst, and it is usually desirable to recirculate the liquid mixture until a satisfactory yield of reaction product is obtained. This can be done as described in the examples, or by pumping the liquid mixture continuously over the catalyst, or in any other suitable manner.

The proportion of reactants is not critical although it is preferred to use at least one mole of active hydrogen compound per mole of acrylonitrile. Preferably, the active hydrogen compound is used in excess, for example, from 1.5 to 50 moles of it per mole of acrylonitrile. An excess of active hydrogen compound tends to favor the formation of monocyanoethylation product. If desired, an inert solvent or diluent may be used, particularly if one or more of the reaction products is difficultly soluble in the reaction mixture. In some cases, it is desirable to operate in the presence of water to minimize undesirable condensation reactions. For the same reason, when the reaction mixture is distilled and the condensate passed through the catalyst, it may be helpful to have small amounts of a non-volatile acid in the mixture being distilled.

The amount of catalyst used, and its degree of subdivision, is not critical provided there is enough of it to provide contact with the liquid mixture of reactants. As a general rule, from 1% to 50%, and preferably from 5% to 25%, of 10 to 200 mesh catalyst, based on the weight of acrylonitrile, is sufficient for substantially complete conversion in batch operations. In continuous operation, of course, the amount of catalyst may exceed the amount of reactants at any given time. As has been shown, the polyquaternary ammonium hydroxide resins have a long catalyst life. Moreover, the spent catalysts can be regenerated, for example, by washing with a suitable solvent and heating, under reduced pressure if desired, by treating with solutions of strong bases, and/or by treating with an acid to convert to the acid salt then back to the hydroxide form.

The reaction temperature, that is, the temperature at which catalyst and reactants are in contact, is desirably maintained below 75° C. to prevent possible decomposition and polymerization reactions. It may be as low as 0° C. or even lower because of the great activity of the catalysts. A convenient temperature range is between 15° C. and 65° C.

The contact time is not material and it only needs to be long enough to produce an appreciable yield of cyanoethylation products. A relatively short contact time tends to favor the production of monocyanoethylation products.

The products obtainable by the process of this invention, i. e., the compounds containing beta-cyanoethyl groups, have long been recognized as useful per se or as intermediates in the preparation of many other compounds such as mono- or poly-carboxylic acids, mono- or poly-amines, nitrogen containing heterocyclics, and the like.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention it is to be understood that the invention is not to be limited to said details except as set forth in the appended claims.

We claim:

1. In the process of cyanoethylation of a compound containing a reactive hydrogen atom with a cyanoethylating agent taken from the group consisting of acrylonitrile and acrylonitriles having aliphatic hydrocarbon substituents of one to two carbon atoms the step which comprises carrying out the cyanoethylation reaction in the presence of a cross-linked polyquaternary ammonium hydroxide resin.

2. In the process of cyanoethylation of a compound containing a reactive hydrogen atom with a cyanoethylating agent taken from the group consisting of acrylonitrile and acrylonitriles having aliphatic hydrocarbon substituents of one to two carbon atoms the step which comprises carrying out the cyanoethylation reaction in the presence of a cross-linked polyquaternary ammonium hydroxide resin and with at least one mole of said compound containing a reactive hydrogen atom present for each mole of said cyanoethylating agent.

3. In the process of cyanoethylation of a compound containing a reactive hydrogen atom with a cyanoethylating agent taken from the group consisting of acrylonitrile and acrylonitriles having aliphatic hydrocarbon substitutents of one to two carbon atoms the step which comprises carrying out the cyanoethylation reaction in the presence of a cross-linked polyquaternary ammonium hydroxide resin and with 1.5 to 50 moles of said compound containing a reactive hydrogen atom present for each mole of said cyanoethylating agent.

4. In the process of cyanoethylation of a compound containing a reactive hydrogen atom with a cyanoethylating agent taken from the group consisting of acrylonitrile and acrylonitriles having aliphatic hydrocarbon substituents of one to two carbon atoms the step which comprises carrying out the cyanoethylation reaction at a temperature between 15° C. and 75° C. in the presence of a cross-linked polyquaternary ammonium hydroxide resin and with 1.5 to 50 moles of said compound containing a reactive hydrogen atom present for each mole of said cyanoethylating agent.

5. In the process of cyanoethylation of a compound containing a reactive hydrogen atom with a cyanoethylating agent taken from the group consisting of acrylonitrile and acrylonitriles having aliphatic hydrocarbon substituents of one to two carbon atoms the step which comprises carrying out the cyanoethylation reaction at a temperature of between 15° C. and 75° C. in the presence of 1% to 50%, based on the weight of the cyanoethylation agent, of a cross-linked polyquaternary ammonium hydroxide resin and with 1.5 to 50 moles of said compound containing a reactive hydrogen atom present for each mole of said cyanoethylation agent.

6. In the process of cyanoethylation of methyl ethyl ketone with acrylonitrile the step which comprises carrying out the cyanoethylation reaction in the presence of a cross-linked polyquaternary ammonium hydroxide resin.

7. In the process of cyanoethylation of isobutyraldehyde with acrylonitrile the step which comprises carrying out the cyanoethylation reaction in the presence of a cross-linked polyquaternary ammonium hydroxide resin.

8. In the process of cyanoethylation of water with acrylonitrile the step which comprises carrying out the cyanoethylation reaction in the presence of a cross-linked polyquaternary ammonium hydroxide resin.

BENJAMIN W. HOWK.
CARL M. LANGKAMMERER.

REFERENCES CITED

The following references are of record in the file of this patent:

Nachod "Ion Exchange," (Academic Press), pp. 271–272 (1949).

Adams et al., "Organic Reactions" (Wiley), vol. 5, pp. 79–81, 95–97, (1949).